United States Patent

[11] 3,597,083

| [72] | Inventor | Robert M. Fraser<br>Lincoln, Mass. |
|---|---|---|
| [21] | Appl. No. | 816,730 |
| [22] | Filed | Apr. 16, 1969 |
| [45] | Patented | Aug. 3, 1971 |
| [73] | Assignee | Itek Corporation<br>Lexington, Mass. |

[54] METHOD AND APPARATUS FOR DETECTING REGISTRATION BETWEEN MULTIPLE IMAGES
15 Claims, 6 Drawing Figs.

[52] U.S. Cl.................................................. 356/2,
250/220 SP
[51] Int. Cl................................................ G01c 11/12
[50] Field of Search........................................250/220 SP;
356/2

[56] References Cited
UNITED STATES PATENTS

| 3,246,560 | 4/1966 | Birnbaum et al. ............ | 356/2 |
| 3,432,674 | 3/1969 | Hobrough .................... | 356/2 |

*Primary Examiner*—Ronald L. Wibert
*Assistant Examiner*—Orville B. Chew, II
*Attorneys*—Homer O. Blair, Robert L. Nathans and William C. Roch

ABSTRACT: This disclosure relates to a method and apparatus for the detection of the relative distortion between two patterns. Analog video signals, obtained by synchronously scanning the two patterns, are converted to binary waveforms having level changes corresponding to zero crossings of the respective analog signals. The binary signals are then compared and the intervals of disagreement noted and assigned a plus or minus sign, depending upon which of the two signals initiated the disagreement. The algebraic sum of the disagreement intervals is shown to be of a magnitude and sign as will indicate the amount and direction of the distortion differences.

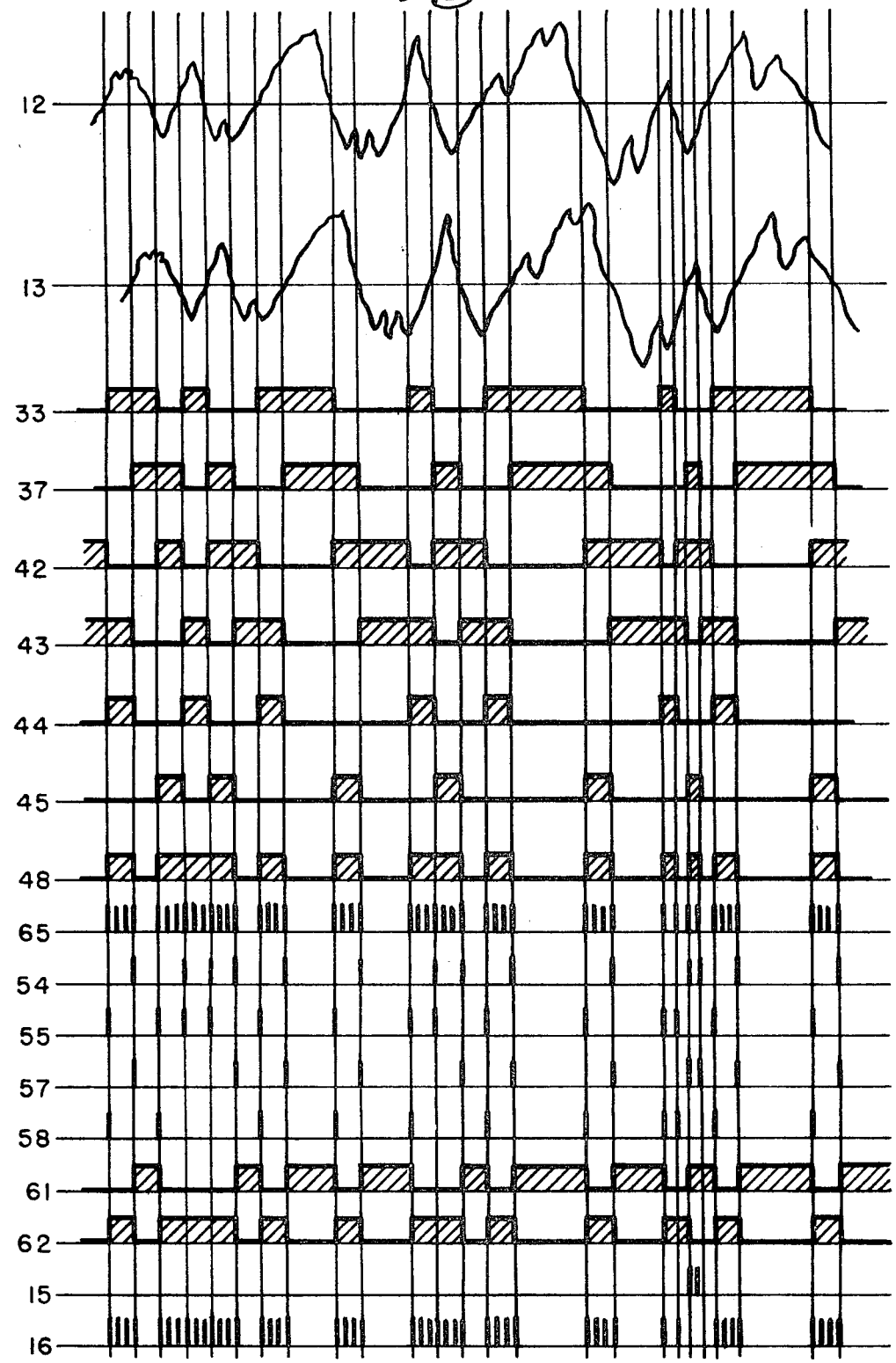

METHOD AND APPARATUS FOR DETECTING REGISTRATION BETWEEN MULTIPLE IMAGES

BACKGROUND OF THE INVENTION

This invention relates generally to a control system for combining related electrical signals and is especially suited for use with dual image registration systems.

Although not so limited, the present invention is particularly well suited for use with image registration systems employed during the production of topographic maps. Typically, maps of this type are obtained from stereoscopically related photographs taken from airplanes. When the photographs are accurately positioned in locations corresponding to the relative positions in which they were taken, their projection upon a suitable base can produce for an observer a three-dimensional presentation of the particular terrain imaged on the photographs.

Because of practical flight photography limitations, however, the stereophotographs generally do not possess images of exactly corresponding surface areas. For this reason a coherent stereopresentation is obtained only if the photographs are properly registered, i.e. so positioned that homologous areas in the two projections are aligned and have the same orientation. The problem of image registration is accentuated by the fact that image detail in the photographs typically is not identical in all respects. Such detail nonuniformity is caused, for example, by photographing a scene from different camera viewpoints or by variations in altitude, roll and pitch of the photographic aircraft. The resultant distortion between corresponding areas in the photographs prevents common detail registration when the images retained by both photographs are projected onto a common viewing plane.

There have been developed several types of systems which simplify the registration of stereoimages. Basically, most such systems derive video signals from image detail in each photograph of a stereogram. Correlation of the video signals results in parallax indicating signals that represent both the magnitude and sense of phase shift existing between the compared signals. Finally, analysis of the parallax signals produces error signals indicating various types of distortion. These error signals are used to control image displacement and transformation equipment that produce registration of the projected images. The image transformation can be accomplished, for example, by altering the rasters in the scanning devices utilized, by introducing relative movement between the two photographs, by controlling adjustable optical devices used for projection of the images, etc. Examples of stereoimage registration systems are disclosed in U.S. Pat. No. 3,432,674 issued Mar. 11, 1969 to Gilbert L. Hobrough, and entitled "Photographic Image Registration"; and U.S. application Ser. No. 691,536 entitled "Image Correlation System" and filed Dec. 18, 1967, both assigned to the assignee of this invention.

A modified image registration system is disclosed in U.S. Pat. No. 3,534,167 issued Oct. 13, 1970 to John A. O described binary signals are formed having level changes that correspond to slope polarity reversals in the video analog signals. Disagreement intervals wherein the video waveforms possess slopes of opposite polarity are established by compairing the binary signals and those intervals are separated into distinguishable interval portionx resulting from slope reversals by each h of the video waveforms. The difference between the distingusihable interval portions is proportional to both the degree and direction of relative detail shift existing between the compared images. Although generally quite useful, the system does exhibit certain limitations. Because the video signal slope reversals are detected by differentiator circuits with inherent time constants, the system is essentially a high pass filter. Consequently, low frequency signal components which retain useful information corresponding to large scale misregistration are not correlated. This condition limits the maximum range of misregistration that can be corrected.

The object of this invention, therefore, is to provide an improved instrument for comparing corresponding detail retained by related exhibits. A more specific object of this invention is to provide such an instrument specifically suited for use in measuring parallax and other distortions existing between stereophotographs used in the field of photogrammetry.

CHARACTERIZATION OF THE INVENTION

This invention is characterized by the provision of a multiple display comparison instrument that generates first and second analog signals representing variable detail along a given path in a first exhibit and along a corresponding path in a second exhibit being compared with the first. The instrumennt compares the analog signals and establishes detail shift in the exhibits by determining disagreement intervals wherein the analog signals are opposite polarity with respect to a given signal level. Comparison of the analog signals ' polarities provides useful information regarding detail shift in the compared exhibits.

One feature of the invention is the provision of a multiple display comparison instrument of the above type including a discriminator which distnguishes disagreeement interval portions that result from polarity reversals in the first analog signal from those disagreement interval portions that result from polarity reversals in the second analog signal. By separating the disagreement intervals into portions initiated by polarity reversals in each of the analog signals, one is able to determine the relative direction of existing detail shift.

Another featureof this invention it the provision of a multiple display comparison instrument of the above type including a device for measuring the difference between the combined lengths of the separated disagreement interval portions. This difference provides a measurement of the magnitude of relative detail shift in the exhibits.

Another reature of this invention is the provision of a multiple display comparison instreument of the above type which converts the analog signals into first and second binary signals having level changes corresponding to polarity reversals with respect to the given signal level in each of the respective analog signals. The determination of the disagreement intervals is simplified by producing the easily compared binary signals. Furthermore, the conversion of the initially obtained analog signals into binary form renders the instrumenet particularly well suited for use with the conventional digital logic employed in commericial computer circuits.

Another feature of this invention is the provision of a multiple display comparison instruement of the above type including a pulse generating circuit which produces uniformly spaced addition output pulses during one of the disagreement interval portions and distinguishable subtraction output pulses during the other disagreement interval portions. The separate addition and subtraction pulses represent in convenient digitial form both the magnitude and sense of any detail shift existing in the compared exhibits.

The invention is characterized further by the provision of a dual image registration method wherein the polarities of analog signals representing variable detail along corresponding paths in the images are cpmpared with a given signal level. Disagreement intervals wjerein the signals are of opposite polarity denote misregistration existing between the images. In adition, the sense of misregistration is determined by noting which of the two analog signals initiates a majority of th3 disagreement intervals.

BRIEF DESCRIPTION OF THE DRAWINGS

These and other objects and features of the invention will become more apparent upon a perusal of the following specification taken in conjunction with the accompanying drawings wherein:

FIG. 6 is a graph showing a plurality of waveforms representing another set of conditions in the correlation system of FIG. 2.

DESCRIPTION OF THE PREFERRED EMBODIMENT

Figure 1:
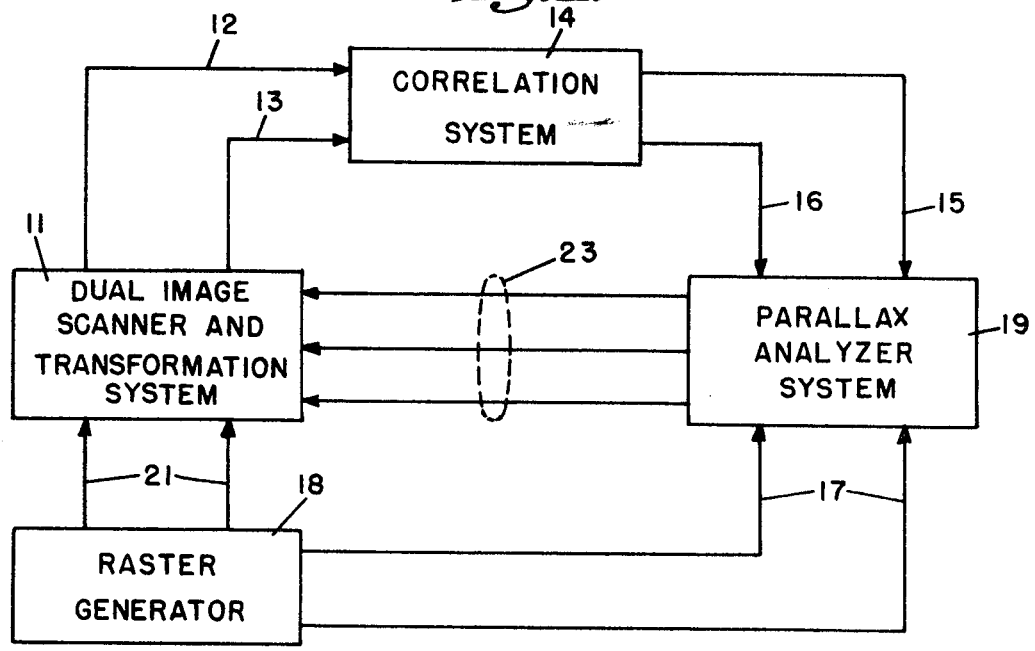
FIG. 1 is a general block diagram illustrating the functional interrelation of the main components of the apparatus.

Referring now to FIG. 1 there is shown the dual image scanner and transformation system 11 which is adapted to simultaneously scan corresponding paths in a pair of stereophotographs and provides on lines 12 and 13 video signals representing the image detail along those paths. The video signals on lines 12 and 13 are applied to the correlation system 14 that provides on lines 15 and 16 composite error signals isndicating relative displacement between the common image detail along the simultaneously scanned paths. These composite derror signals are received by the parallax analyzer system 19. Also applied to the analyzer system 19 on lines 17 are reverence signals received from the raster generator 18 that produces on lines 21 deflection voltages for the scanning devices used in the scanner system 11. Analysis in system 19 of the combined error signals on lines 15 and 16 with respect to the reference signals on lines 17 produces error signals on lines 23 representing various types of relative distortion exisiting between the projected images of the photographs being scanned in the scanner system 11. These signals are applied to the scanner and transformation system 11 and used to eliminate the relative image distrortion which they represent. The details of the image scanner and transformation system 11 and the analyzer system 19, which do not per se comprise a part of the present invention, are conventional and can be for example, of the type dis closed in the above noted U.S. a pplications.

During use of the system shown in FIG. 1, the video signals appearing on the signal lines 12 and 13 enter the correlation system 14 which, as described in greater detail below, converts the video analog signals into binary signals and compares these signals to determine phase displacement of the video input signals 12 and 13. Such displacement is indicative of parallax error existing between the photographic images being compared. As noted above, the correlation system 14 also determines the sense of any detected displacement and produces on the signal line 16 addition digitial output pulses representing the degree to which the video signal 12 leads the video signal 13 and on the siginal line 15 subtraction digital output pulses representing the degree to which the video signal 13 leads the video signal 12.

Figure 2:
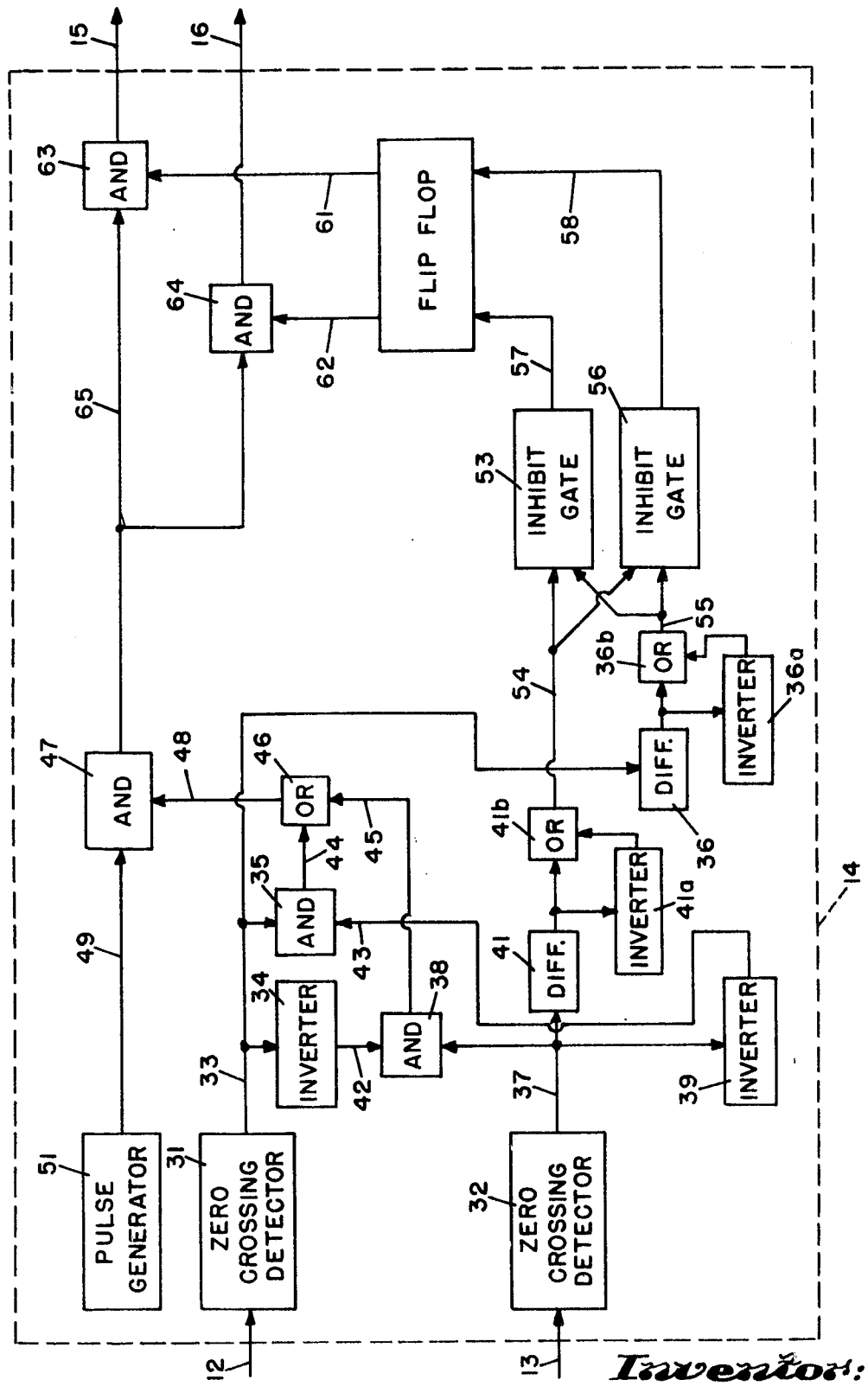
FIG. 2 is a block diagram of the correlation system shown in FIG. 1.

FIG. 2 is a schematic block diagram of the correlation system 14 shown in FIG. 1. The pair of zero crossing detectors 31 and 32, which are described in greater detail below, receive, respectively, the video signals on lines 12 and 13. The output from the zero crossing detector 31 is fed on signal line 33 to the inverter circuit 34, the AND gate 35, and the differentiator circuit 36. Similarly, the output from the zero crossing detector 32 is fed on signal line 37 to the AND gate 38, the invertere circuit 39 and the differentiator circuit 41. Receiving the outputs of the inverter circuits 34 and 39 on lines 42 and 43 are, respectively, the AND gates 38 and 35. Signal outputs of the AND agates 35 and 38 on lines 44 and 45, respectively, both are fed into the OR gate 46 that provides an input to the and gate 47 on signal line 48. Also received by AND gate 47 on signal line 49 are pulses generated in the pulse generator 51.

Positive output pulses from the differentiator circuit 41 are fed to the OR gate 41b that also receive inverted negative pulses from the inverter 41a. Similarly, positive pulses are the differentiator circuit 36 and inverted negative pulses from the inverter 36a are received by the OR gate 36b. Both inhibit gates 53 and 56 receive pulses from both OR gates 36b and 41b and feed output pulses on lines 57 and 58, respectively, to the flip-flop circuit 59. REsponisve to the pulses on lines 57 and 58 the flip-flop circuit 59 produces a gating voltage on either output line 61 or 62. These signals are applied, respectively, to the AND gates 63 and 64 which also receive on line 65 the output of the AND gate 47. The digital outputs of AND gates 63 and 64 appear, respectively, on signal lines 15 and 16 shown in FIG. 1 between the correlation system 14 and the parallax analyzer system 19.

Figure 3:
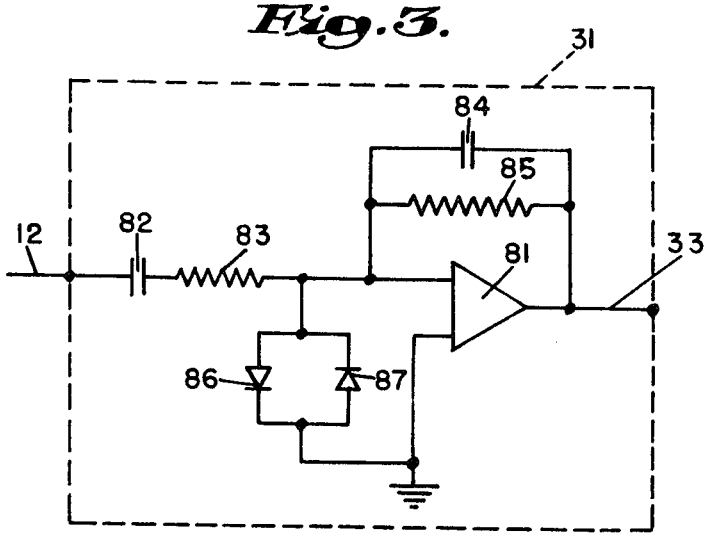
FIG. 3 is a schematic circuit diagram of the zero-crossing detectors shown in FIG. 2.

FIG. 3 is a circuit diagram of the zero-crossing detector 31 which is identaical to zero-crossing detector 32. The input on line 12 is applied to the amplifier 81 through the series connected capacitor 82 and resistor 83. Connected across the amplifier 33 are the capacitor 84 and resistor 85. The parallel diodes 86 and 87 are coupled across the input and ground terminals of the amplifier 81 which provides an output on signal line 33.

The zero-crossing detector 31 produces a binary output on line 33 having positive or zero values depending upon whether the video signal on line 12 is positive or negative with respect to its average value. Thus, line 33 exhibits a positive voltage during periods in which the video signal on line 12 has a greater than average value, and zero voltage during periods in which the video signal is below average value. Conversely, inverter circuit 34 provides on line 42 a positive voltage during periods of below average video signal vakyes and zeri viktage during periods of above average video signal values.

In a similar manner the zero-crossing detector 32 produces a binary output on line 37 having positive or zero values depending upon the polarity of the video signal on line 13. Thus, the detector 32 produces on line 37 a positive voltage during periods of above average video signal values and zero voltage during periods of below average video signal values. Conversely, the inverter circuit 39 produces on line 43 a positive voltage during periods of below average video signal vaues and zero voltage during periods of above average video signal values.

The binary signals on the lines 33 and 43 are combined in the AND gate 35 that produ ces on the signal line 44 a positive signal only upon the occurrence of positive signals on both the signal lines 33 and 43. Similarly, the binary signals on the signal lines 37 and 42 are comined in the AND gate 38 that produces on the signal line 45 a positive signal only upon the occurrence of positive signals on both signal lines 37 and 42. OR gate 46 produces on the signal line 48 a positive output when either of the input signals from the signal lines 44 and 45 is positive and a zero output when voltages on obth lines 44 and 45 are zero.

Thus, OR gate 46 produces on the signal line 48 a positive output signal when the signal values on the lines 33 and 37 disagree and zero output when they agree. However, as described above, the binary signal on line 33 has positive and zero values dependent upon the polarity of the video signal on the line 12 and the binary signal on line 37 has positive and zero values dependent upon the polariyt of the video signal on the line 13. The value of the signal on output line 48 at any time, therefore, represents the polarity relationship exisint between the video waveforms on the signal lines 12 and 13. For example, when the polarities of the video waveforms on the signal lines 12 and 13 are either both positive or both negative, no output appears on line 48 bur when one of the video waveforms is positive and the other negative, the signal on line 48 will possess a positive value.

The AND gate 47 receives the signal on the line 48 and sampling pulses produ ced on line 49 by the pulse generator 51. Received sampling pulses are transmitted onto the output line 65 only when the signal on line 48 has a positive value. Thus, the digital output pulses on line 65 represent increments of disagreement in the polarities of the video signals on line 12 and 13.

Figure 4:
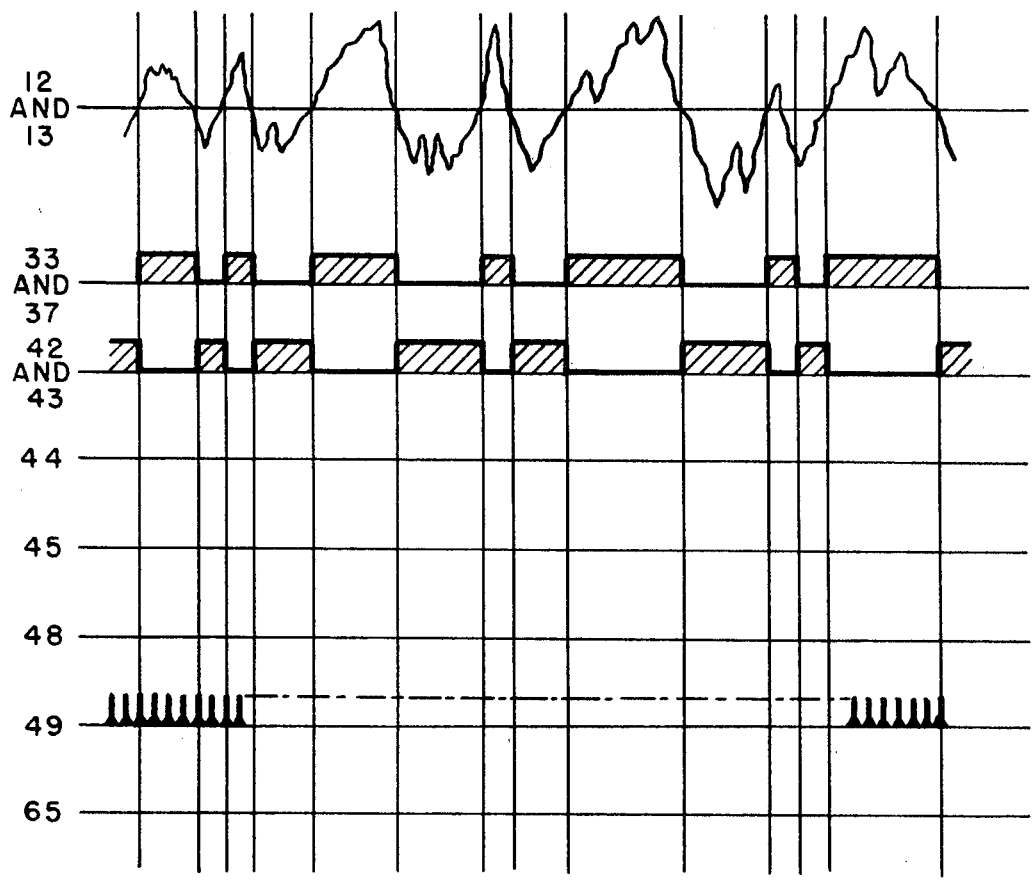
FIG. 4 is a graph showing a plurality of waveforms representing one set of conditions in the correlation system of FIG. 2.

To further illustrate operation of the correlation system 14, one can first consider a hupothetical situation wherein the scanner system 11 produces on the lines 12 and 13 signals having identical waveforms. Su h conditions a would exist if the scanning beams produced by the system 11 were passing simultaneously through exactly homologous regions in a pair of photographic images. A hypothetical waveofrm representing identical video signals on lines 12 and 13 and the various waveforms generated thereby in the correlation system 14 are illustrated in FIG. 4. As shown, simultaneous positive signals never occur on either signal lines 33 and 43 or on signal lines 37 and 42. Therefore, the outputs of the AND gates 35 and 38 and of the OR gate 46 remain zero. Theand gate 47 responds by failing to teansmit to the signal line 65 any of the sampling pulses on the signal line 49. This zero output indicates the absence of disagreement (parallax) between the compared photographic images and is a correct indication for the assumed conditions of perfect registration.

Figure 5:
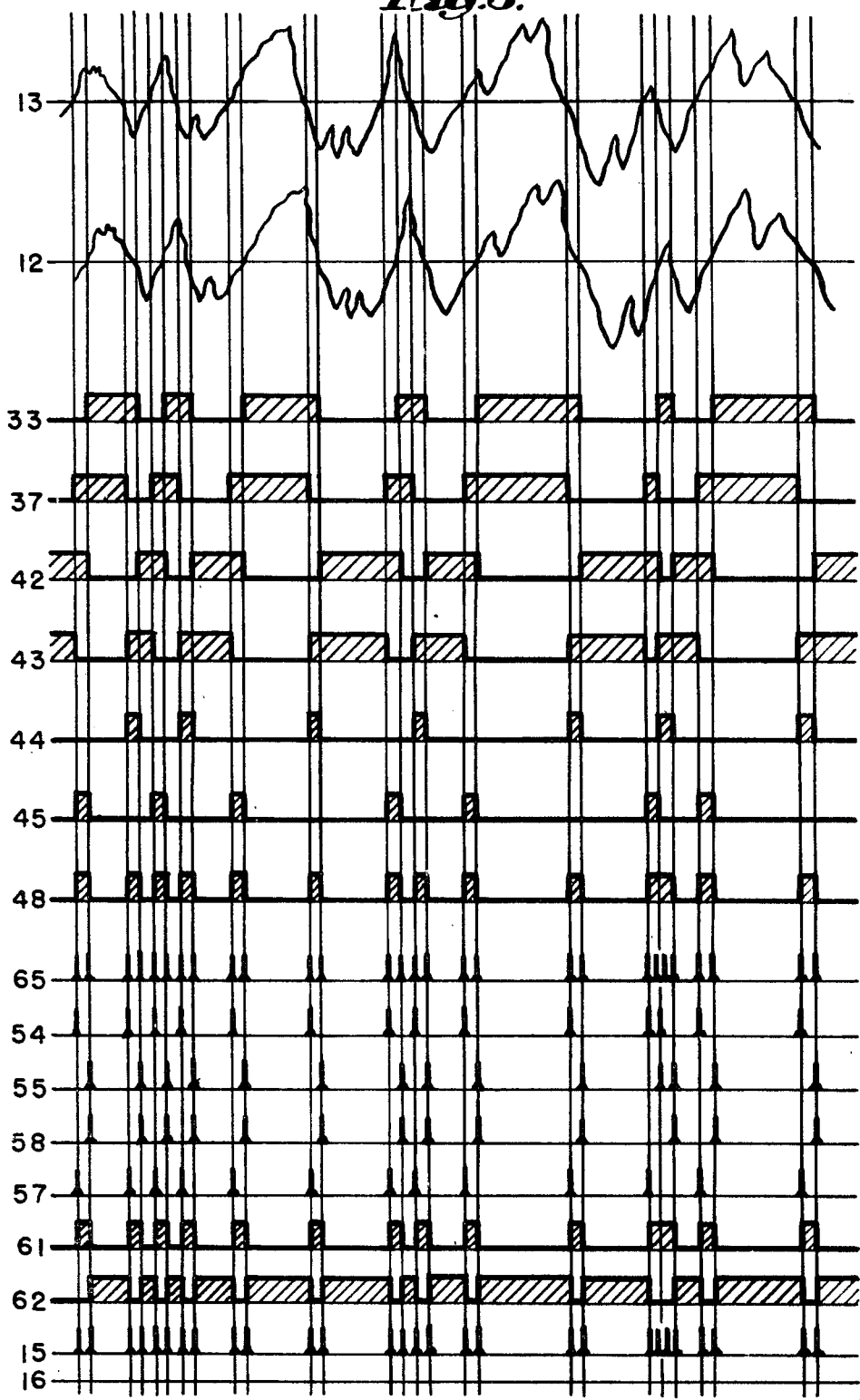
FIG. 5 is a graph showing a plurality of waveforms representing another set of conditions in the correlation system of FIG. 2.

Referring now to FIG. 5, there are illustrated resultant video waveforms under a condition wherein exact registration does not exist between the scanned areas of the photographic images. As shown, the video waveform on the left signal line 12 is shifted slightly to the right with respect to the identical video waveform on the signal line 13. This condition would exist, for example, if one of the scanned images were shifted from the position that produced the above described perefect registration. The output waveforms generated on the various signal lines of the correlation system 14 by the phase sighted video inputs are shown with solid lines in FIG. 5. The periods along the time axis wherein opposite polaritites exist in the video waveforms 12 and 13 result in corresponding periods wherein either the signals on the signal lines 33 and 34 or those on the signal lines 37 and 42 are simultaneoulsly positive. These periods produ ce on the signal lines 44 and 45 the illustrated positive signal value periods which would combine on the signal line 48 and open AND gate 47 permitting transmission of digital pulses on signal line 65.

The presence of digital pulses on signal line 65 only indicates the existence of parallax between the compared photographic images but the number of such pulses denotes the magnitude of the parallax. This fact is illustrated in FIG. 6 wherein the waveform representing the video signal on line 12 again has been phase shifted with respect to that appearing on signal line 13. However, the shift is opposite in direction and of substantially greater magnitude than that shown in FIG. 5. This condition in the video signals would exist, for example, if the one image were again shifted from the position that produced registration but with a shift distance greater and a directioon opposite to that assumed above. Again, the periods along the time axis wherein the video waveforms have opposite polarities result in corresponding positive signal periods on either the line 44 or the line 45. These signal periods are combined in the signal line 48 and open the AND gate 47 to produce digital output pulses on the signal line 65. It will be noted that the larger phase shift illustrated in FIG. 6 with respect to that in FIG. 4 is accompanied by a correspondingly larger number of output pulses on the signal line 65.

Although the digital output on the signal line 65 is indicative of both the existence and the magnitude of parallaxes between the compared images as represented by the phase shifts between the corresponding waveforms on the signal lines 12 and 13, the output does not iidentify the direction of shifts which in the illustrated examples of FIGS. 5 and 6 were in opposite directions. Naturally, a determination of the direction of shift is required before any type of corrective action can be taken.

To describe how the present invention determines shift direction, reference again is made to FIG. 2. The differentiator 36 produces a positive pulse in response to each zero to positive state reversal in the binary signal on line 33 and a negative pulse in response to each positive to zero state reversal. The negative pulses are changed to positive pulses by the inverter circuit 36a and both sets of positive pulses are passed by the OR gate 36b. Thus, as shown in FIGS. 5 and 6, a positive pulse appears on line 55 in response to each change of state in the binary signal on line 33. In the same manner a positive pulse is produced on line 54 in response to each change of state in the binary signal on line 37, as also illustrated in FIGS. 5 and 6.

The inhibit gate 53 passes each pulse received on line 54 to the output signal line 57 unless a similtaneous inhibiting pulse is received on signal line 55. Similarly, the inhibit gate 56 passes onto output signal line 58 each pulse received from signal line 55 unless a simultaneous inhibiting pulse is received from signal line 54. Thus, the flip-flop circuit 59 receives all pulses produced by the differentiator 36 exvept those inhibited by simultaneous pulses from differentiator 41, and receives all pulses produce d by differentiator 41 except those inhibited by simultaneous pulses from differentiator 36. The output of flip-flop circuit 59 on signal line 61 is a binary signal having a positive value after reception of a pulse on signal line 57 and a zero vaue after recption of a pulse on the signal line 58. Also proudced by the flip-flop circuit 59 on signal line 62 is a complementary binary signal having a positive value when the signal on line 61 is zero and a zero value when the signal on line 61 is positivel.

The output voltages from the flip-flop 59 function as gating signals for the AND gates 63 and 64 each connected to the AND gate 47 by the signal line 65. Only during periods of positive voltage on lignal line 61 is AND gate 63 open and effective to transmit digital pulses from signal line 65 to the output line 15. In the same way, only during periods of positive voltage on control line 62 is the AND gate 64 open and effective to transmit digital pulses from line 65 to output line 16.

The manner in which the above described circuit elements establish the sense of the parallax represented by the digital output on signal line 65 will be explained by referring again to the waveforms shown in FIGS. 5 and 6. As shown in FIG. 5, each period of polarity disagreement between the waveforms 12 and 13 is represented by a corresponding period of positive voltage on signal line 48 and by resultant digital output pulses on signal line 65. An examination of the waveforms reveals that each of these period s is initiated by a polarity reversal in the leading video waveform on signal line 13. The pulses on signal line 57 representing these polarity reversals produce on output line 61 of the flip-flop 59 positive voltage periods which correspond in time with the output pulses on signal line 65. Accordingly, all of the output pulses on signal line 65 are transmitted by the open AND gate 63 to the output line 15. Thus, the presence of digital pulses on signal line 15, which can be arbitrarily designated the subtraction output line, denotes that the video signal on line 13 is leading the signal on line 12.

With the conditions assumed in FIG. 6 all opposite polarlity periods except the third from the last are initiated by polarity reversals in the waveform appearing on the signal line 12. The pulses representing these reversals on signal line 58 produce on output line 62 of flip-flop 59 positive voltage periods which correspond in time with all except the third from the last set of pulses on line 65. Accordingly, those output pulses are transmitted by the open AND gate 64 onto line 16 which can be arbitrarily dsignated the addition output line. The third from the last pulse set corresponds in time with a positive voltage on line 61 initiated by the polarity reversal in the video signal on line 13. Consequently, that pulse set is transmitted by open AND gate 63 onto subtraction output line 15. Thus, the overwhelming preponderance of pulses appears on addition line 16 denoting that the video signal on line 13 lags that on line 12.

It will be apparent, therefore, that the difference between the numbers of pulses appearing on the addition output line 16 and the subtraction output line 15 indicates the magnitude of composite phase shift existing b between the video signals on the signal lines 12 and 13 and, accordingly, of the composite parallax existing between the compared images. Furthermore, the polarity of the algebraic summation signifies the sense of the parallax with a positive summation deniting parallax error in one direction and a negative summation denoting parallax error in theo opposite direction.

The parallax analyzer system 19 correlates the digital outputs on lines 15 and 16 with the reference signals on lines 17 which represent the locations and velocities of the scanning spots used in the scanner system 11. As a result of this correlation, there are produced digital outputs representing various types of distortion such as X and Y scale, X and Y skew, etc. Details of an analyzer system suitable for these operations are disclosed in the above noted U.SPat. No. 3,543,167.

Although the above description and accompanying drawings relate to a preferred embodiment of the invention, it will be obvious that various modifications in circuitry and operating techniques could be utilized without departing from the basic and novel concepts of the invention. For example, exhibits other than photographic transparancies could be compared. Similarly, in some applications given exhibit could be used to generate a first analog signal for comparison with a previously obtained reference signal retained on tape or other suitable storage mechanism. Also, although the described tehcnique of summing the increments of polariyt disagreement along the compared scanning paths is preferred the analogous relationship existing between increments of agreement could also be used. The summation of disagreements technique is preferred, however, because it provides a greater observable detail shift range than does the summation of agreements technique.

I claim:

1. A multiple display comparison apparatus comprising electrical signal generating means for producing a first analog signal representig variable detail along a given path in a first exhibit and a second analog signal representing variable detail along a corresponding path in a second exhibit to be compared with the first exhibit, correlator circuit means for comparing the polarities of said first and second analog signals with respect to a give signal value, said correlator circuit means comprising detector means for determining the disagreement intervals along said given corresponding paths wherein n said first and second analog signals are of opposite polarity with respect to the given signal value and discriminator means for distinguishing first interval portions of said disagreement intervals resulting from polarity reversals in said first analog signal from second interval portions of said disagreement intervals resulting from polarity reversals in said second analog signal.

2. A multiple display comparison apparatus according to claim 1 including analyzer means for determining the difference between the combined lengths of said first and second interval portions.

3. A multiple display comparison apparatus according to claim 1 wherein said detector means comprises conversion means which produces a first binary signal having level changes which correspond to polarity reversals in said first analog signal with respect to said given signal value and a second binary signal having level changes which correspond to polarity reversals in said second analog signal with respect to said given signal value, and comparison means for determining said disagreement intervals by compairing the levels of said first and second binary signals.

4. A multiple display comparison apparatus according to claim 3 including analyzer means for determining the difference between the combined lengths of said first and second interval portions.

5. A multiple display comparison apparatus according to claim 4 wherein said measuring means produces a digital output representing said difference.

6. A multiple display comparison apparatus according to claim 5 wherein said digital output representing said difference comprises addition pulses on an addition line representing the combined lengths of said first intervzl portions and subtraction pulses on a subtraction line representing the combined lengths of said second interval portions.

7. A multiple display comparison apparatus according to claim 1 wherein said first and second exhibits comprise photographic images having homologous regions, and said first and second analog signals are video signals produced by directing scanning beams through said photographic images along said given and corresponding pahts.

8. A multiple display comparison apparatus according to claim 7 including analyzer means for determining the difference between the combined lengths of said first and second interval portions.

9. A multiple display comparison apparatus according to claim 7 wherein said detector means comprises conversion means which produces a first binary signal having level changes which correspond to polarity reversals in said first analog signal with respect to said given signal vaue and a second binary signal having level changes which correspond to polarity reversals in said second analog signal with respect to said given signal value, and comparison means for determining said disagreement by comparing the levels of said first and sec ond binary signals.

10. A multiple display comparison apparatus according to claim 9 including analyzer means for determining the difference between the combined lengths of said first and second interval portions.

11. A multiple display comparison apparatus according to claim 10 wherein said measuring means produces a digital output representing said difference.

12. A multiple display comparison apparatus according to claim 11 wherein said digital output representing said difference comprises a ddition pulses on an addition line representing the combined lengths of said first interval portions and subtraction pulses on a subtraction line representing the combined lengths of said second interval portions.

13. A method for comparing relative e location of detail in similar exhibits comprising the steps of; fproducing a first electrical analog disgnal representing variable detail along a given path in one exhibit , producin a second electrical analog signal representing variable detail along a corresponding path in a nother exhibit, compairing the polarities of the first and second analog signaLs with respect to a given signal value, determining the disagreement intervals along said given and corresponding paths wherein said first and second alalog signals have opposite polairyt with respect to the given signal value, and distingusihing betweer portions of said disagreement intervals resulting from polarity reversals in said first analog signal and those resulting from polarity reversals in said second analog signal.

14. A method according to claim 13 including the steop of determining the difference between the combined lengths of each of said disagreement interval portions.

15. a method according to claim 14 wherein said comparing step comprises the steps of producing a first b binary signal having level changes corresponding to polarity reversals in said first analog signal with respect to said given signal value and a second binary signal having level changes corresponding to polarity reversals in said second analog signal with respect to given signal value.